United States Patent
Snyder et al.

(10) Patent No.: US 9,840,967 B2
(45) Date of Patent: Dec. 12, 2017

(54) RAM AIR THERMAL MANAGEMENT SYSTEM

(71) Applicant: Rolls-Royce North American Technologies, Inc., Indianapolis, IN (US)

(72) Inventors: Douglas J. Snyder, Carmel, IN (US); Kenneth M. Pesyna, Carmel, IN (US)

(73) Assignee: Rolls-Royce North American Technologies, Inc., Indianapolis, IN (US)

( * ) Notice: Subject to any disclaimer, the term of this patent is extended or adjusted under 35 U.S.C. 154(b) by 955 days.

(21) Appl. No.: 14/132,716

(22) Filed: Dec. 18, 2013

(65) Prior Publication Data
US 2014/0246170 A1 Sep. 4, 2014

Related U.S. Application Data

(60) Provisional application No. 61/772,414, filed on Mar. 4, 2013.

(51) Int. Cl.
*F01N 5/02* (2006.01)
*F02C 7/18* (2006.01)
(Continued)

(52) U.S. Cl.
CPC ............. *F02C 7/185* (2013.01); *F02C 7/14* (2013.01); *F02K 3/115* (2013.01);
(Continued)

(58) Field of Classification Search
CPC .. F02C 7/185; F02C 7/14; F02K 3/115; F02K 3/065; F02K 3/077; F05D 2260/601;
(Continued)

(56) References Cited

U.S. PATENT DOCUMENTS 3,045,983 A 7/1962 Best
4,351,150 A 9/1982 Schulze
(Continued)

FOREIGN PATENT DOCUMENTS

EP 1898069 A2 3/2008

OTHER PUBLICATIONS

International Search Report for PCT/US2013/076522 dated May 8, 2014.

*Primary Examiner* — Travis Ruby
(74) *Attorney, Agent, or Firm* — Fishman Stewart PLLC

(57) ABSTRACT

An aircraft may have a heat generating component and an engine, at least one of which generates a heat load, and a thermal management system to cool the heat load. The engine may have a duct and an engine fan configured to draw an inlet air stream into an inlet portion of the duct, where at least a portion of the inlet air stream may be used as an engine air stream. The thermal management system may include a cooling circuit configured to circulate a fluid through the heat load such that at least a portion of it may be transferred to the fluid, a heat exchanger configured to enable heat transfer between the fluid and a cooling air stream, and a pumping device. The pumping device may be configured to draw the cooling air stream through the heat exchanger and into a portion of the engine air stream.

20 Claims, 2 Drawing Sheets

(51) Int. Cl.
  *F02K 3/115* (2006.01)
  *F02C 7/14* (2006.01)
(52) U.S. Cl.
  CPC ....... *F05D 2260/601* (2013.01); *Y02T 50/671* (2013.01); *Y02T 50/675* (2013.01)
(58) Field of Classification Search
  CPC .... F28F 2215/06; F28F 2215/08; F28F 3/027; F28D 2021/0021
  USPC .......................................................... 165/51
  See application file for complete search history.

(56) References Cited

U.S. PATENT DOCUMENTS

| | | |
|---|---|---|
| 5,031,693 A * | 7/1991 | VanDyke ................ F28F 3/027 165/166 |
| 5,284,012 A | 2/1994 | Laborie et al. |
| 5,351,476 A | 10/1994 | Laborie et al. |
| 5,357,742 A | 10/1994 | Miller |
| 5,414,992 A | 5/1995 | Glickstein |
| 5,438,823 A | 8/1995 | Loxley et al. |
| 6,189,324 B1 | 2/2001 | Williams et al. |
| 6,205,803 B1 | 3/2001 | Scaringe |
| 6,282,881 B1 | 9/2001 | Beutin et al. |
| 6,415,621 B2 | 7/2002 | Buchholz et al. |
| 6,942,183 B2 | 9/2005 | Zywiak |
| 7,520,465 B2 | 4/2009 | Mahjoub |
| 7,797,962 B2 | 9/2010 | Kresser et al. |
| 7,849,702 B2 | 12/2010 | Parikh |
| 7,861,968 B2 | 1/2011 | Parikh et al. |
| 7,946,806 B2 | 5/2011 | Murphy |
| 8,127,555 B2 | 3/2012 | Jarmon et al. |
| 2004/0020213 A1 | 2/2004 | Jones |
| 2006/0117734 A1 | 6/2006 | Larkin et al. |
| 2009/0097972 A1 | 4/2009 | Murphy |
| 2010/0180571 A1 | 7/2010 | Zysman et al. |
| 2010/0326104 A1 | 12/2010 | Ebigt et al. |
| 2011/0115227 A1 | 5/2011 | Shafer et al. |
| 2011/0179767 A1 | 7/2011 | Rinjonneau et al. |
| 2011/0283713 A1 | 11/2011 | Kelnhofer |
| 2011/0315354 A1 | 12/2011 | Johnson |

* cited by examiner

RAM AIR THERMAL MANAGEMENT SYSTEM

CROSS-REFERENCE TO RELATED APPLICATIONS

This application claims priority to U.S. Provisional Patent Application No. 61/772,414 filed Mar. 4, 2013, the contents of which are hereby incorporated in their entirety.

FIELD OF TECHNOLOGY

The disclosure pertains to a thermal management system that utilizes ram air to manage temperatures of components of an aircraft, which may include the engine.

BACKGROUND

Various components of an aircraft generate heat, and therefore, must be cooled to a specific temperature or temperature range in order to operate effectively. However, available heat sinks within the aircraft, for example fuel and engine air streams, are often at higher temperatures than the operable temperature ranges of the heat generating components. In some systems, ram air being drawn into an engine of the aircraft may be utilized to absorb the heat load via heat exchangers. However, the resulting air out of the heat exchanger often is discarded overboard. This may result in ram drag that increases engine specific fuel consumption (SFC), and may also result in large, long ducts along the length of the engine that add weight and take up space. Another alternative is to place the heat exchangers at the inlet of the engine, such as through the use of surface coolers. However, this approach may introduce blockage at the front of the engine and may also add thermal and pressure distortions, which may affect the performance and flow stability of the engine fan.

BRIEF DESCRIPTION OF THE DRAWINGS

While the claims are not limited to a specific illustration, an appreciation of the various aspects is best gained through a discussion of various examples thereof. Referring now to the drawings, exemplary illustrations are shown in detail. Although the drawings represent the illustrations, the drawings are not necessarily to scale and certain features may be exaggerated to better illustrate and explain an innovative aspect of an example. Further, the exemplary illustrations described herein are not intended to be exhaustive or otherwise limiting or restricted to the precise form and configuration shown in the drawings and disclosed in the following detailed description. Exemplary illustrations are described in detail by referring to the drawings as follows:

DETAILED DESCRIPTION

Figure 1:
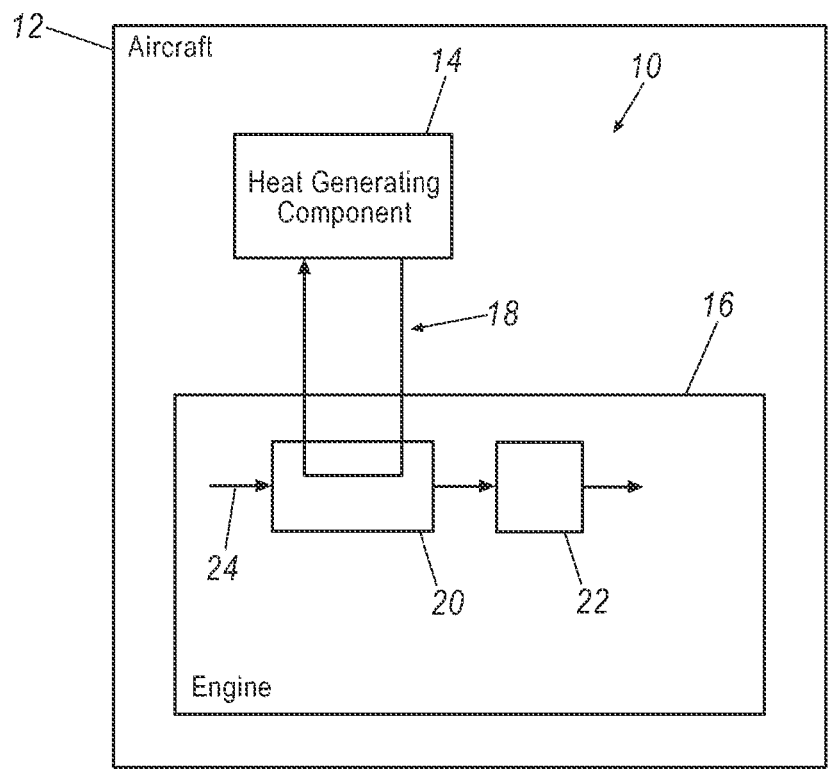
FIG. 1 illustrates a schematic block and flow diagram of an exemplary aircraft having a thermal management system integrated with an engine and a heat generating component.

An exemplary thermal management system integrated with an engine of an aircraft to cool a heat load is described herein. The heat load may be generated at the engine itself and/or at another heat generating component of the aircraft. The engine may have an engine fan configured to draw in an inlet air stream, at least a portion of which may be used as an engine air stream downstream of the engine fan. The thermal management system may include a cooling circuit configured to circulate a fluid through the heat load such that at least a portion of the heat load may be transferred to the fluid. The thermal management system may also include a heat exchanger in fluid communication with the cooling circuit, where the heat exchanger may be configured to enable heat transfer between the fluid and a cooling air stream. The thermal management system may further include a pumping device configured to draw the cooling air stream through the heat exchanger and into a portion of the engine air stream downstream of the engine fan.

An exemplary aircraft is also described herein. The aircraft may include a heat generating component and an engine, at least one of which generates a heat load, and a thermal management system. The engine may include a duct with a wall defining an engine inlet and an inlet portion at which an inlet air stream may be collected. The engine may also include an engine fan configured to draw the inlet air stream into the inlet portion of the duct through the engine inlet. At least a portion of the inlet air stream may be used as an engine air stream downstream of the engine fan. The thermal management system may include a cooling circuit configured to circulate a fluid through the heat load such that at least a portion of the heat load is transferable to the fluid. The thermal management system may also include a heat exchanger in fluid communication with the cooling circuit, where the heat exchanger may be configured to enable heat transfer between the fluid and a cooling air stream. The thermal management system may further include a pumping device configured to draw the cooling air stream through the heat exchanger, and to move the cooling air stream into a portion of the engine air stream downstream of the engine fan.

An exemplary method of managing heat loads in an aircraft via an engine and a thermal management system is further described herein. The method may include circulating a fluid through a heat load. The method may then include circulating the fluid through a heat exchanger of the thermal management system. The method may then include drawing, by an engine fan of the engine, an inlet air stream into an inlet portion of a duct of the engine. A portion of the inlet air stream may be used as an engine air stream downstream of the engine fan. The method may then include drawing, by a pumping device of the thermal management system, a cooling air stream through the heat exchanger to enable heat transfer between the fluid and the cooling air stream. The method may further include depositing, by the pumping device, the cooling air stream from the heat exchanger into a portion of the engine air stream.

Referring now to the figures, FIG. 1 illustrates an exemplary thermal management system 10 for an aircraft 12. The aircraft 12 may include a heat generating component 14 and an engine 16. While the heat generating component 14 and the engine 16 are shown and described hereinafter as being separate components, it should be appreciated that the engine 16 may be the heat generating component 14. The heat generating component 14 generally may generate a heat load. The heat generating component 14 may need to be maintained below a certain temperature, thereby requiring the heat load to be rejected to a heat sink. While one heat generating component 14 is shown in FIG. 1, it should be appreciated that the aircraft 12 may include any number of heat generating components 12 that each generate a heat load, and that each may have different temperature requirement.

The engine 16 generally may utilize ram air as an engine air stream to generate power. The thermal management system 10 may be integrated with the engine 16 and the heat generating component 14 to remove at least a portion of the heat load and utilize the ram air as a heat sink, thereby cooling the heat generating component 14 to its operable temperature range. To accomplish this, the thermal management system 10 may include a cooling circuit 18, a heat exchanger 20, and a pumping device 22.

The cooling circuit 18 may be in fluid communication with the heat generating component 14 and the heat exchanger 20, and may be configured to circulate a fluid through the heat load to absorb at least a portion of the heat load, thereby resulting in a higher temperature of the fluid. In one exemplary approach, the cooling circuit 18 may include or may be part of a refrigeration system (not shown). While the heat generating component 14 is shown exterior to the engine 16, it should be appreciated that the heat generating component 14 may be internal to the engine 16 as well.

Figure 4:
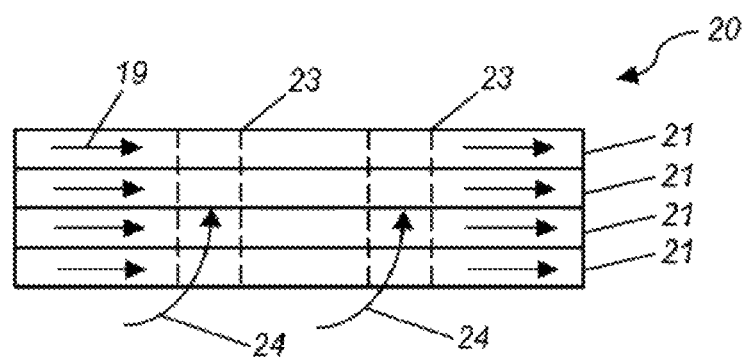
FIG. 4 illustrates a heat exchanger of the thermal management system of FIG. 1 according to one exemplary approach.

The heat exchanger 20 may be configured to enable heat transfer between the higher temperature fluid and a cooling air stream 24, as described in more detail below. The cooling air stream 24 generally may be at a temperature lower than the higher temperature fluid after absorbing the heat load from the heat generating component 14. As such, at least a portion of the heat load may, in turn, be absorbed by the cooling air stream 24 flowing through the heat exchanger 20. In one exemplary approach, the heat exchanger 20 may be a tube bundle heat exchanger. In another exemplary approach illustrated in FIG. 4, the heat exchanger 20 may be made of a plurality of sheets of metal 21 stacked and bonded together, each of the plurality of sheets of metal having at least one through hole 23 aligned with each other such that the cooling air stream 24 may flow through the plurality of sheets of metal 21. At least one of the sheets of metal 21 may be configured to enable the higher temperature fluid 19 to flow through it such that there may be heat exchanged with the cooling air stream 24 flowing through the holes.

Figure 2:
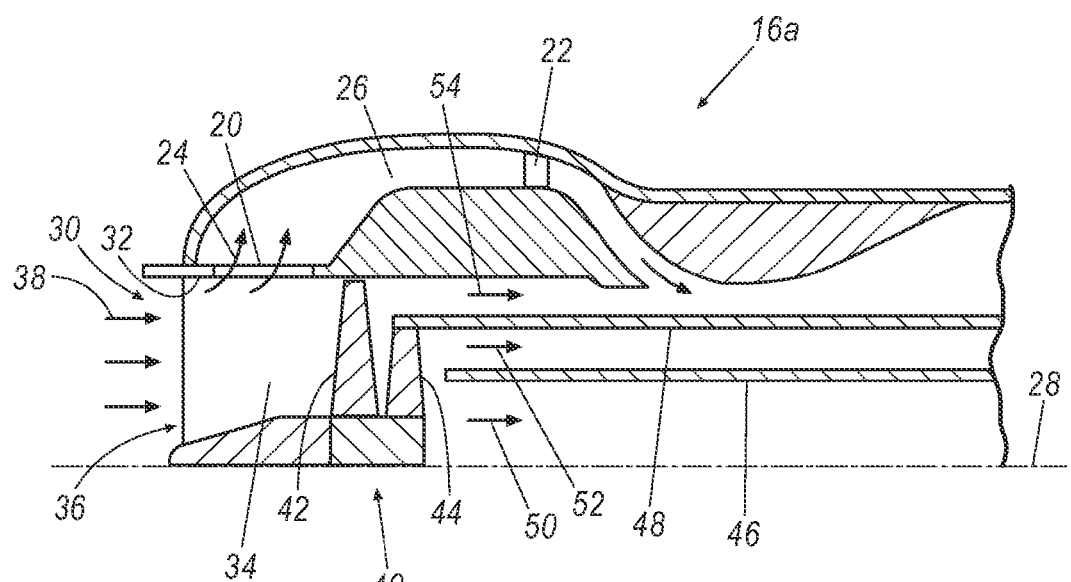
FIG. 2 illustrates a partial, cross-sectional view of the engine of FIG. 1 according to one exemplary approach.

The pumping device 22 may be configured to draw the cooling air stream 24 through the heat exchanger 20. This may be accomplished by lowering the pressure on the outlet side of the heat exchanger 20 lower than that of the ram air. For example, as seen in FIG. 2, the thermal management system 10 may include a plenum 26 on the air outlet side of the heat exchanger 20 in which the volume is of a lower pressure than the ram air. The pumping device 22 may then deposit the higher temperature cooling air stream 24 into a portion of the engine air stream, as described in more detail hereinafter. The pumping device 22 may be, but is not limited to, a compressor, an ejector, and the like, or any combination thereof. Where the pumping device 22 may be a compressor, it may be located in the plenum 26 with the cooling air stream 24 flowing through it, as seen in FIG. 2. Where the pumping device 22 may be an ejector, it may be located at or near the exit of the cooling air stream 24 into the engine air stream, as seen in FIG. 3.

Figure 3:
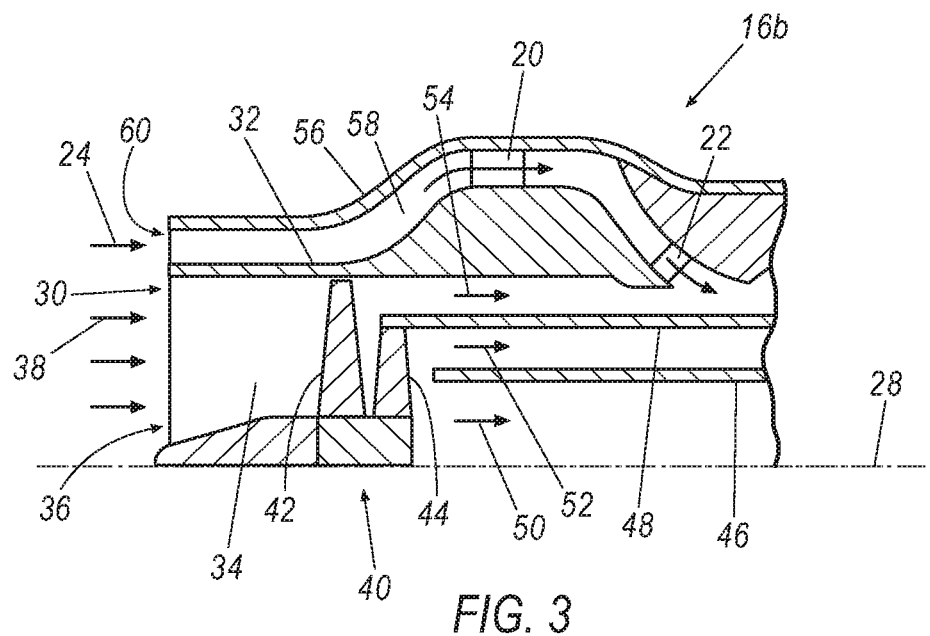
FIG. 3 illustrates a partial, cross-sectional view of the engine of FIG. 1 according to another exemplary approach.

Referring now to FIGS. 2 and 3 in which partial cross-sections of different exemplary engines 16a and 16b are shown above the engine centerline 28, the engine 16 may include a duct 30 having a wall 32 that defines an inlet portion 34 and an engine inlet 36 through which an inlet air stream 38 may enter the duct 30 and be collected in the inlet portion 32. The engine 16 also may have an engine fan 40 to draw the inlet air stream 38 into the duct 30 such that the inlet air stream 38 may be used as an engine air stream downstream of the engine fan 40 to generate the power. The engine fan 40 may include a first fan blade 42 and a second fan blade 44, as well as a first dividing plate 46 and a second dividing plate 48, to divide the engine air stream into a core stream 50, a bypass stream 52, and a third stream 54. The pressure in the third stream 54 generally may be lower than that of the bypass stream 52. It should be appreciated that the engine 16 may have just the first fan blade 42 and the first dividing plate 46 to divide the engine fan stream into the core stream 50 and the bypass stream 52 only.

In the exemplary engine 16a illustrated in FIG. 2, the heat exchanger 20 may be integrated in the wall 32 of the engine duct 30 at the inlet portion 34. In such an example, the cooling air stream 24 may be drawn from the inlet air stream 38. The heat exchanger 20 may be configured such that the fluid from the cooling circuit 18 flows in the wall 32 as the inlet air stream 38 passes through the wall 32 from the inlet portion 34 into the plenum 26. Where the heat exchanger 20 is a stack of plurality of sheets of metals, the holes through which the cooling air stream 24 may be drawn from the inlet air stream 38 may be positioned at the engine inlet 36. This may provide suction at the engine inlet 36, thereby removing boundary layer from the inlet air stream 38, which may allow for reduced length of the inlet portion 32 of the duct 30 and/or improved operation of the engine fan 40. In addition, the duct 30 may be configured such that the engine air stream has a smaller flow area where the cooling air stream enters the engine air stream than substantially the remainder of the engine air stream. This may reduce the static pressure of the engine air stream, thereby assisting the cooling air stream 24 to be drawn into the plenum 26 and deposited into the engine air stream.

In the exemplary engine 16b illustrated in FIG. 3, the engine 16b may include an outer casing 56 surrounding at least the inlet portion 34 of the duct 30 to define a cooling passageway 58 with an annular inlet 60 through which the cooling air stream 24 may be drawn from outside of the aircraft 12. In such an example, the heat exchanger 20 may be disposed within the cooling passageway 58.

The thermal management system 10 provides several advantages. First, utilizing ram air as the heat sink for rejecting the heat load from the heat generating component may result in higher refrigeration efficiency and reduce power extraction on the engine 16. It could enable the use of higher efficiency vapor cycle refrigeration systems, and could even enable cooling without the use of a refrigeration system. Second, the ram air is returned to the engine cycle where it can produce thrust, rather than being dumped overboard where no thrust is produced, which may result in ram drag. Third, the size (e.g., the volume and weight) of the duct for passing ram air from the inlet portion 28 to downstream of the engine exit may be reduced, as explained above.

It will be appreciated that the aforementioned method and devices may be modified to have some components and steps removed, or may have additional components and steps added, all of which are deemed to be within the spirit of the present disclosure. Even though the present disclosure has been described in detail with reference to specific embodiments, it will be appreciated that the various modifications and changes can be made to these embodiments without departing from the scope of the present disclosure as set forth in the claims. The specification and the drawings are to be regarded as an illustrative thought instead of merely restrictive thought.

What is claimed is:

1. A thermal management system for an aircraft having an engine and a heat generating component, at least one of which generates a heat load, the engine having an engine fan configured to draw in an engine inlet air stream, at least a portion of which is to be used as an engine air stream downstream of the engine fan, the thermal management system comprising:
   a cooling circuit configured to circulate a fluid through the heat load such that at least a portion of the heat load is transferrable to the fluid;
   a heat exchanger in fluid communication with the cooling circuit, the heat exchanger being configured to enable heat transfer between the fluid and a cooling air stream, the heat exchanger being located upstream of the engine fan;
   a plenum starting at an air outlet side of the heat exchanger; and
   a pumping device located within the plenum and configured to draw the cooling air stream through the heat exchanger and into a portion of the engine air stream downstream of the engine fan.

2. The thermal management system of claim 1 wherein the engine includes a first dividing plate downstream of the engine fan, the first dividing plate being configured to divide the engine air stream into a core stream and a bypass stream, and wherein the pumping device is configured to deposit the cooling air stream from the heat exchanger into the bypass stream.

3. The thermal management system of claim 1 wherein the engine fan includes a first blade and a second blade, and the engine includes a first dividing plate and a second dividing plate downstream of the engine fan such that the engine air stream is divisible into a core stream, a bypass stream, and a third stream, and wherein the pumping device is configured to deposit the cooling air stream from the heat exchanger to the third stream.

4. The thermal management system of claim 1 wherein the pumping device is a compressor.

5. The thermal management system of claim 1 wherein the pumping device is an ejector.

6. The thermal management system of claim 1 wherein the heat exchanger is a tube bundle heat exchanger.

7. The thermal management system of claim 1 wherein the heat exchanger is configured such that the cooling air stream is drawn from the inlet air stream.

8. The thermal management system of claim 1 wherein the heat exchanger comprises a plurality of sheets of metal stacked and bonded together, each of the plurality of sheets of metal having at least one through hole aligned with each other such that the cooling air stream is flowable through the plurality of sheets of metal.

9. The thermal management system of claim 8 wherein the holes are positioned at the engine inlet.

10. An aircraft comprising:
    a heat generating component and an engine, at least one of which generates a heat load, the engine having:
    a duct having a wall defining an inlet portion with an engine inlet at which an inlet air stream is collectable;
    an engine fan having at least one fan blade and configured to draw the engine inlet air stream into the duct, at least a portion of the engine inlet air stream being used as an engine air stream downstream of the engine fan; and
    a thermal management system having:
    a cooling circuit configured to circulate a fluid, the cooling circuit being in fluid communication with the at least one of a heat generating component and an engine such that at least a portion of the heat load is transferrable to the fluid;
    a heat exchanger in fluid communication with the cooling circuit and located upstream of the at least one fan blade, the heat exchanger being configured to enable heat transfer between the fluid and a cooling air stream drawn from a portion of the engine inlet air stream; and
    a pumping device configured to draw the cooling air stream through the heat exchanger and to a portion of the engine air stream downstream of the engine fan.

11. The aircraft of claim 10 wherein the engine includes a first dividing plate downstream of the engine fan, the first dividing plate being configured to divide the engine air stream into a core stream and a bypass stream, and wherein the pumping device is configured to deposit the cooling air stream from the heat exchanger into the bypass stream.

12. The aircraft of claim 10 wherein the engine includes a first dividing plate and a second dividing plate downstream of the engine fan, the first dividing plate and the second dividing plate being configured to divide the engine air stream into a core stream, a bypass stream, and a third stream, and wherein the pumping device is configured to deposit the cooling air stream from the heat exchanger into the third stream.

13. The aircraft of claim 10 wherein the pumping device is a compressor.

14. The aircraft of claim 10 wherein the pumping device is an ejector.

15. The aircraft of claim 10 wherein the heat exchanger is integrated into the duct wall such that the cooling air stream is drawn from the inlet air stream.

16. The aircraft of claim 10 wherein the engine further comprises an outer casing around at least the inlet portion of the duct to define a cooling passageway with an annular inlet, the pumping device being configured to draw the cooling air stream through the annular inlet.

17. The aircraft of claim 16 wherein the heat exchanger is disposed within the cooling passageway.

18. The aircraft of claim 10 wherein the duct is configured such that the engine air stream has a smaller flow area where the cooling air stream enters the engine air stream than substantially the remainder of the engine air stream.

19. A method of managing heat loads in an aircraft via an engine and a thermal management system, the method comprising:
    circulating a fluid through a heat generating component that generates a heat load such that the fluid absorbs at least a portion of the heat load;
    circulating the fluid through a heat exchanger of the thermal management system;
    drawing, by an engine fan of the engine, an engine inlet air stream into a duct of the engine, a portion of the engine inlet air stream being used as an engine air stream downstream of the engine fan;
    drawing, by a pumping device of the thermal management system, a cooling air stream through the heat exchanger upstream of at least one fan blade of the engine fan to enable heat transfer from the fluid to the cooling air stream; and
    depositing, by the pumping device, the cooling air stream from the heat exchanger to a portion of the engine air stream.

20. The method of claim 19 wherein the cooling air stream is drawn from the engine inlet air stream.

* * * * *